US 6,682,663 B2

(12) United States Patent
Botty et al.

(10) Patent No.: US 6,682,663 B2
(45) Date of Patent: *Jan. 27, 2004

(54) PIGMENT WITH DAY-LIGHT FLUORESCENCE

(75) Inventors: Gilbert Botty, Venlo (NL); Hubertus T. Hintzen, Eindhoven (NL); Jost W. H. van Krevel, Eindhoven (NL)

(73) Assignee: Osram Opto Semiconductors GmbH, Regensburg (DE)

( * ) Notice: Subject to any disclaimer, the term of this patent is extended or adjusted under 35 U.S.C. 154(b) by 155 days.

This patent is subject to a terminal disclaimer.

(21) Appl. No.: 09/889,899

(22) PCT Filed: Nov. 30, 2000

(86) PCT No.: PCT/EP00/12047

§ 371 (c)(1),
(2), (4) Date: Nov. 23, 2001

(87) PCT Pub. No.: WO01/39574

PCT Pub. Date: Jun. 7, 2001

(65) Prior Publication Data

US 2003/0024438 A1 Feb. 6, 2003

(30) Foreign Application Priority Data

Nov. 30, 1999 (EP) .............................. 99123747

(51) Int. Cl.$^7$ .................. C09K 11/54; C09K 11/09; C09K 11/59
(52) U.S. Cl. .................. 252/301.4 R; 252/301.4 F; 106/461; 106/482; 423/351
(58) Field of Search ................ 252/301.4 R; 106/461; 106/482; 423/351

(56) References Cited

U.S. PATENT DOCUMENTS 6,501,102 B2 * 12/2002 Mueller-Mach et al. ........ 257/84

2003/0006702 A1 * 1/2003 Mueller-Mach et al. ..... 313/512
2003/0020101 A1 * 1/2003 Bogner et al. ............... 257/233

OTHER PUBLICATIONS

Abstract for "Luminescence in Eu2+–doped Ba2Si5N8:Fluorescence, Thermoluminscence, and Upconversion", Hoppe et l, Journ. Phys. Chem Solids, vol. 6 (12), Dec. 2000, pp. 2001–2006.*
Chem. Abstract citation 133:356760 Kotlyarchuk et al, "Plused Laser Deposition of Phosphor Nitride Thin Films".*
Lee et al, "Photoluminescence and Electroluminscence Characteristics of CaSiN2:Eu Phosphor", Proc. SPIE Int. Soc. Opt. Eng 3241, 1997, pp. 75–79.*
Lee et al, "Develpoment and Luminescent Characteristics of CaSiN2 Based Phosphors".*
Lee, Lim: Development and Luminescent Characteristics of CaSiN2 Based Phosphors; Journal of the Institute of Electronic Engineering of Korea, Oct. 99 vol 36D, No. 10 pp. 31–36 ISSN 1226–5845.
Blasse and Grabmeier: Luminescent Materials, Springer Verlag, Heidelberg, 1994, p. 33–50.
Blasse: Special Cases of divalent lanthanide emission, Eur. J. Solid State Inorg. Chem. 33 (1996), p. 175.
Poort, Blokpoel and Blasse: Luminescence of Eu2+ in Barium and Strontium Aluminate and Gailate, Chem. Mater. 7 (1995), p. 1547.
Poort, Reijnhoudt, van der Kuip, and Blasse: Luminescence of Eu2+ in Silicate host lattices with Alkaline earth ions in a row, J. Alloys and Comp. 241 (1996), p. 75.

(List continued on next page.)

Primary Examiner—C. Melissa Koslow
(74) Attorney, Agent, or Firm—Frishauf, Holtz, Goodman & Chick, P.C.

(57) ABSTRACT

A pigment, especially a yellow to red emitting luminescent material, with a host lattice of the nitridosilicate type $M_xSi_yN_z$:Eu, wherein M is at least one of an alkaline earth metal chosen from the group Ca, Sr, Ba and wherein $z=\frac{2}{3}x+\frac{4}{3}y$.

13 Claims, 6 Drawing Sheets

OTHER PUBLICATIONS

Nakao, Luminescence centers of MgS, CaS and CaSe Phosphors Activated with Eu2+ Ion, J. Phys. Soc. Jpn. 48(1980), p. 534.

Davolos, Garcia, Fouassier, and Hagenmuller, Luminescence of Eu2+ in Strontium and Barium Thiogallates, J. Solid. State Chem. 83 (1989), p. 316.

Diaz and Keszler; Red, Green, and Blue Eu2+ luminescence in solid state Borates: a structure–property relationship, Mater. Res. Bull. 31 (1996), p. 147.

Gaido, Dubrovskii, and Zykov: Photoluminescence of MgSiN2 Activated by Europium, Izv. Akad. Nauk SSSR, Neorg. Mater. 10 (1974), p. 564.

Dubrovskii, Zykov and Chemovets: Luminescence of rare earth Activated MgSiN2, lzv. Akad. Nauk SSSR, Neorg. Mater. 17 (1981), p. 1421.

Lim, Lee, Chang: Photoluminescence Characterization of Mg1–xZnxSiN2:Tb for Thin Film . . . , Berlin, Wissenschaft and Technik Verlag, (1996), p. 363.

Schlieper and Schnick: Nitridosilicate 1, Hochtemperatursynthese und Kristallstruktur von Ca2Si5N8, Z. anorg. alig. Chem. 621, (1995), p. 1037.

Schlieper, Millus and Schnick: Nitridosilicate II, Hochtemperatursynthesen and Kristallstrukturen von Sr2Si5N8 and Ba2Si5N8, Z. anorg. alig. Chem. 621, (1995), p. 1380.

Huppertz and Schnick: Edge–Sharing SiN4 tetrahedra in the highly condensed Nitridosilicate BaSi7N10, Chem. Eur. J. 3(1997), p. 249.

* cited by examiner

PIGMENT WITH DAY-LIGHT FLUORESCENCE

This application is a U.S. National Phase application under 35 U.S.C. 371 of International Application PCT/EP00/12047 filed Nov. 30, 2000 published in English).

TECHNICAL FIELD

This invention relates to a Pigment with day-light fluorescence and more particularly, but not exclusively to a pigment absorbing blue to green light and emitting fluorescence within the yellow to red spectral region under excitation by daylight or by an artificial light source. Further absorption in other spectral regions is possible, especially in the UV. More specifically, such a pigment can be used as a phosphor for light sources, especially for Light Emitting Diodes (LED) or electrical lamps. The pigment belongs to the class of rareearth activated silicon nitrides.

BACKGROUND ART

For $Eu^{2+}$-doped material normally UV-blue emission is observed (Blasse and Grabmeier: Luminescent Materials, Springer Verlag, Heidelberg, 1994). Several studies show that also emission in the green and yellow part of the visible spectrum is possible (Blasse: Special Cases of divalent lanthanide emission, Eur. J. Solid State Inorg. Chem. 33 (1996), p. 175; Poort, Blokpoel and Blasse: Luminescence of $Eu^{2+}$ in Barium and Strontium Aluminate and Gallate, Chem. Mater. 7 (1995), p. 1547; Poort, Meijnhoudt, van der Kuip, and Blasse: Luminescence of $Eu^{2+}$ in Silicate host lattices with Alkaline earth ions in a row, J. Alloys and Comp. 241 (1996), p. 75). Hitherto, red $Eu^{2+}$ luminescence is observed only in some exceptional cases, such as in alkaline earth sulphides and related lattices of the rock-salt type (Nakao, Luminescence centers of MgS, CaS and CaSe Phosphors Activated with $Eu^{2+}$ Ion, J. Phys. Soc. Jpn. 48(1980), p. 534), in alkaline earth thiogallates (Davolos, Garcia, Fouassier, and Hagenmuller, Luminescence of $Eu^{2+}$ in Strontium and Barium Thiogallates, J. Solid. State Chem. 83 (1989), p. 316) and in some borates (Diaz and Keszler; Red, Green, and Blue $Eu^{2+}$ luminescence in solid state Borates: a structure-property relationship, Mater. Res. Bull. 31 (1996), p. 147). $Eu^{2+}$ luminescence in alkaline-earth silicon nitrides has hitherto only been reported for $MgSiN_2$:Eu (Gaido, Dubrovskii, and Zykov: Photoluminescence of $MgSiN_2$ Activated by Europium, lzv. Akad. Nauk SSSR, Neorg. Mater. 10 (1974), p. 564; Dubrovskii, Zykov and Chernovets: Luminescence of rare earth Activated $MgSiN_2$, lzv. Akad. Nauk SSSR, Neorg. Mater. 17 (1981), p. 1421) and $Mg_{1-x}Zn_xSiN_2$:Eu (Lim, Lee, Chang: Photoluminescence Characterization of $Mg_{1-x}Zn_xSiN_2$:Tb for Thin Film Electroluminescent Devices Application, Inorganic and Organic Electroluminescence, Berlin, Wissenschaft und Technik Verlag, (1996), p. 363). For both $Eu^{2+}$ luminescence in the green and green/blue part of the spectrum was found.

New host lattices of the nitridosilicate type are based on a three dimensional network of cross-linked $SiN_4$ tetrahedra in which alkaline earth ions (M=Ca, Sr and Ba) are incorporated. Such lattices are for example $Ca_2Si_5N_8$ (Schlieper and Schlick: Nitridosilicate 1, Hochtemperatursynthese und Kristallstruktur von $Ca_2Si_5N_8$, Z. anorg. alig. Chem. 621, (1995), p. 1037), $Sr_2Si_5N_8$ and $Ba_2Si_5N_8$ (Schlieper, Millus and Schlick: Nitridosilicate II, Hoch-temperatursynthesen und Kristallstrukturen von $Sr_2Si_5N_8$ and $Ba_2Si_5N_8$, Z. anorg. alig. Chem. 621, (1995), p. 1380), and $BaSi_7N_{10}$ (Huppertz and Schnick: Edge-Sharing $SiN_4$ tetrahedra in the highly condensed Nitridosilicate $BaSi_7N_{10}$, Chem. Eur. J. 3 (1997), p. 249). The lattice types are mentioned in Table 1.

Sulfide based phosphors (e.g. earth alkaline sulfides) are less desirable for lighting applications, especially for LED applications, because they interact with the encapsulating resin system, and partially suffer from hydrolytic attack. Red emitting $Eu^{2+}$ activated berates show already temperature quenching to a certain degree at the operating temperature of LEDs.

DISCLOSURE OF THE INVENTION

It is, therefore, an object of this invention to obviate the disadvantages of the prior art. It is another object of the invention to provide a pigment for day-light fluorescence. It is a further abject to provide a yellow to red emitting luminescent material which is excitable at wavelengths around 200 to 500 nm, preferably 300 to 500 nm, together with high chemical and thermal stability.

Especially high stability up to at least 100° C. is highly desirable for LED applications. Their typical operation temperature is around 80° C.

These objects are accomplished by the characterising features of claim 1. Advantageous embodiments can be found in the dependant claims.

The new pigments show at least absorption within the blue-green spectral region. Furthermore they show fluorescent emission under absorption. Those $Eu^{2+}$-doped luminescent materials show emission within the yellow to red spectral region, especially long wavelength red, orange or yellow emission. These pigments are based on alkaline-earth silicon nitride material as hostlattices. They are very promising, especially for LED applications, when used as phosphors. Hitherto white LEDs were realised by combining a blue emitting diode with a yellow emitting phosphor. Such a combination has only a poor colour rendition. A far better performance can be achieved by using a multicolour (for example red-green-blue) system. Typically the new material can be used together with a green-emitting (or yellow-emitting) phosphor, for example strontiumaluminate $SrAl_2O_4$:$Eu^{2+}$, whose emission maximum is around 520 nm.

In detail, the new Pigment with day-light fluorescence uses a host lattice of the nitridosilicate type $M_xSi_yN_z$:Eu, wherein M is at least one of an alkaline earth metal chosen from the group Ca, Sr, Ba and wherein $z=\frac{2}{3}x+\frac{4}{3}y$. The incorporation of nitrogen increases the proportion of covalent bond and ligand-field splitting. As a consequence this leads to a pronounced shift of excitation and emission bands to longer wavelengths in comparison to oxide lattices.

Preferably, the pigment is of the type, wherein x=2, and y=5. In another preferred embodiment, the pigment is of the type, wherein x=1, and y=7.

Preferably, the metal M in the pigment is strontium because the resulting phosphor is emitting at relatively short yellow to red wavelengths. Thus the efficiency is rather high in comparison to most of the other elected metals M.

In a further embodiment the pigment uses a mixture of different metals, for example Ca (10 atom.-%) together with Ba (balance), as component M.

These materials show high absorption and good excitation in the UV and blue visible spectrum (up to more than 450 nm), high quantum efficiency and low temperature quenching up to 100° C.

It can be used as a pigment for coloring goods or as a phosphor for luminescence conversion LEDs, especially with a blue light emitting primary source together with one or more other phosphors (red and green).

Detailed Embodiments $Eu_2O_3$ (with purity 99,99%), or Eu metal (99,99%), Ba metal (>99%); Sr metal (99%), $Ca_3N_2$ (98%), or Ca powder (99,5%) and $Si_3N_4$ (99,9%) were used as commercially available starting materials. Ba and Sr were nitrided by firing at 550 and 800° C. under a nitrogen atmosphere. Subsequently, $Ca_3N_2$ or nitrided Ba, Ca or Sr were ground in a mortar and stoichiometrically mixed with $Si_3N_4$ under nitrogen atmosphere. The Eu-concentration was 10 atom.-% compared to the alkaline earth ion. The powdered mixture was fired in molybdenum crucibles at about 1300–1400° C. in a horizontal tube furnace under nitrogen/hydrogen atmosphere. After firing, the powders were characterised by powder X-ray diffraction (Cu, Kα-line), which showed that all compounds had formed.

Figure 1:
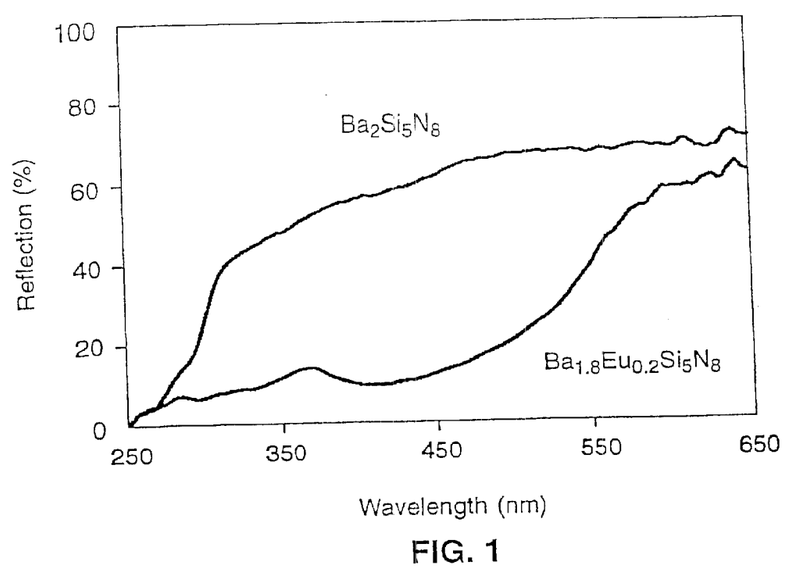
FIG. 1: Diffuse reflection spectra of undoped $Ba_2Si_5N_8$ and $Ba_2Si_5N_8$:Eu.
Figure 2:
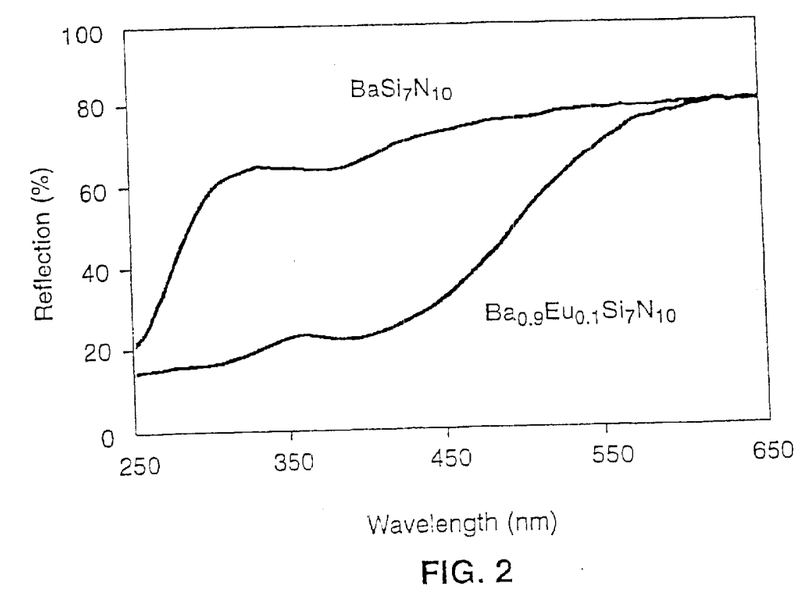
FIG. 2: Diffuse reflection spectra of undoped $BaSi_7N_{10}$ and $BaSi_7N_{10}$:Eu.

The undoped $Ba_2Si_5Na_8$, $Ca_2Si_5N_8$ and $BaSi_7N_{10}$ are greyish-white powders. These undoped rare-earth activated silicon nitrides show high reflection in the visible range (400–650 nm) and a strong drop in the reflection between 250–300 nm (FIGS. 1 and 2). The drop in reflectance is ascribed to host-lattice absorption. The Eu-doped samples are orange-red, except for $BaSi_7N_{10}$:Eu which is orange-yellow (Table 1). The strong coloration is unique for $Eu^{2+}$-doped rare-earth activated silicon nitrides and make these material interesting orange-red pigments. A typical example of a reflection spectrum of $Ba_2Si_5N_8$:Eu shows that the absorption due to Eu is superposed on the hostlattice absorption and extends up to 500–550 nm (FIG. 1). This explains the red-orange colour of these compounds. Similar reflection spectra were observed for $Sr_2Si_5N_8$:Eu and $Ca_2Si_5N8$:Eu.

For $BaSi_7N_{10}$:Eu the absorption of Eu is less far in the visible part (FIG. 2), which explains the orange-yellow colour of this compound.

Figure 3:
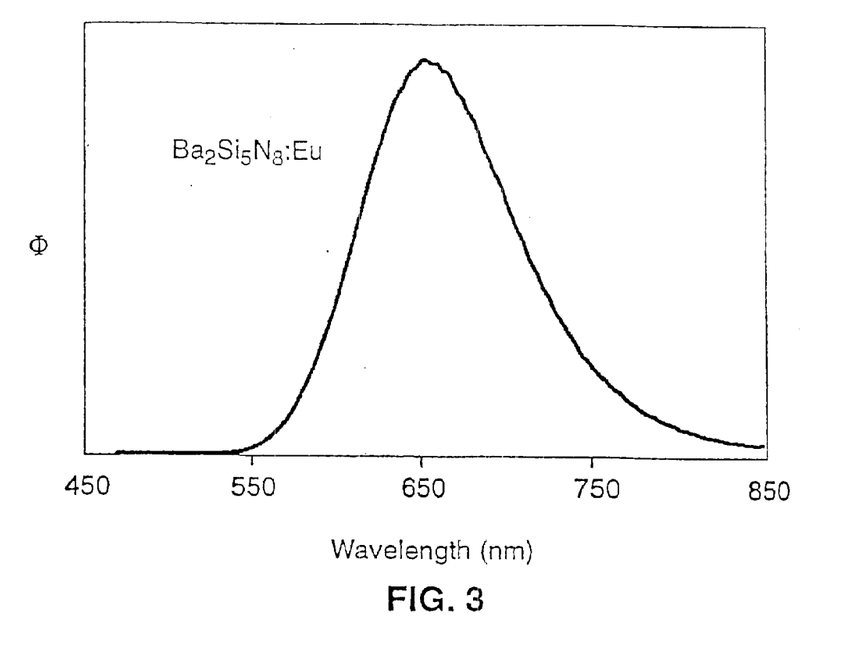
FIG. 3: Emission spectrum of $Ba_2Si_5N_8$:Eu.
Figure 4:
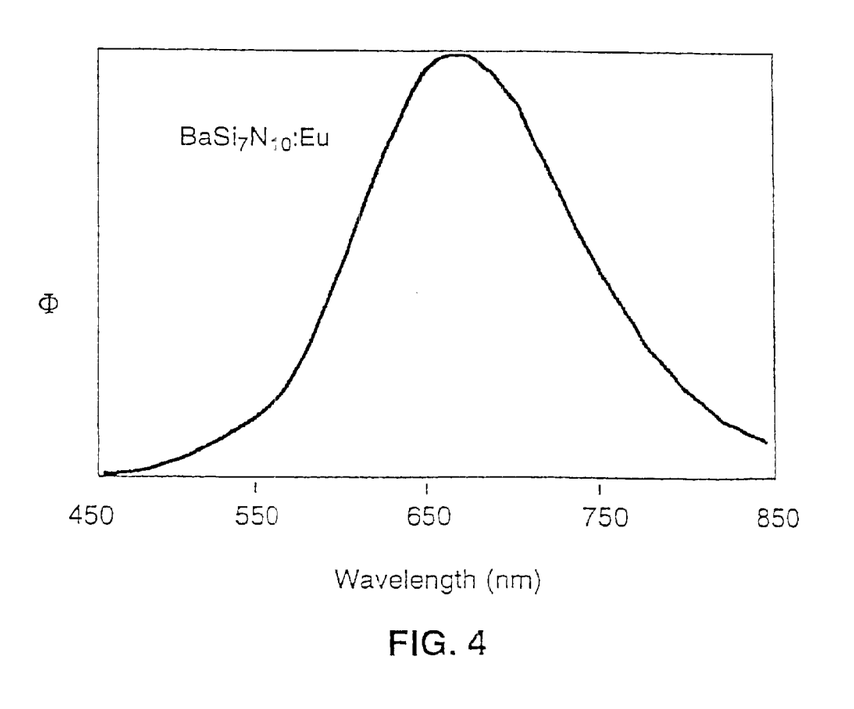
FIG. 4: Emission spectrum of $BaSi_7N_{10}$:Eu.

All samples show efficient luminescence under UV excitation with emission maxima in the orange-red part of the visible spectrum (see Table 1). Two typical examples of emission spectra can be seen in FIGS. 3 and 4. They show that the emission is at extremely long wavelengths (for $Eu^{2+}$ emission) with maxima up to 660 nm for $BaSi_7N_{10}$:Eu (FIG. 4.). Excitation bands are observed at low energy which is the result of a centre of gravity of the $Eu^{2+}$ 5d band at low energy and a strong ligand-field splitting of the $Eu^{2+}$ 5d band, as can be expected for $N^{3-}$ containing lattices (van Krevel, Hintzen, Metselaar, and Meijerink: Long Wavelength $Ce^{3+}$-luminescence in Y—Si—O—N Materials, J. Alloys and Comp. 168 (1998) 272).

Since these materials can convert blue into red light due to low-energy excitation bands, they can be applied in white light sources, for example based on primarily blue-emitting LED's (typically GaN or InGaN) combined with red, yellow and/or green emitting phosphors.

TABLE 1

| Compound | Crystal structure | Color | Emission Maximum (nm)* |
|---|---|---|---|
| $Ca_2Si_5N_8$:Eu | Monoclinic | Orange-Red | 600 to 630 |
| $Sr_2Si_5N_8$:Eu | Orthorhombic | Orange-Red | 610 to 650 |
| $Ba_2Si_5N_8$:Eu | Orthorhombic | Orange-Red | 620 to 660 |
| $BaSi_7N_{10}$:Eu | Monoclinic | Orange-Yellow | 640 to 680 |

Figure 5:
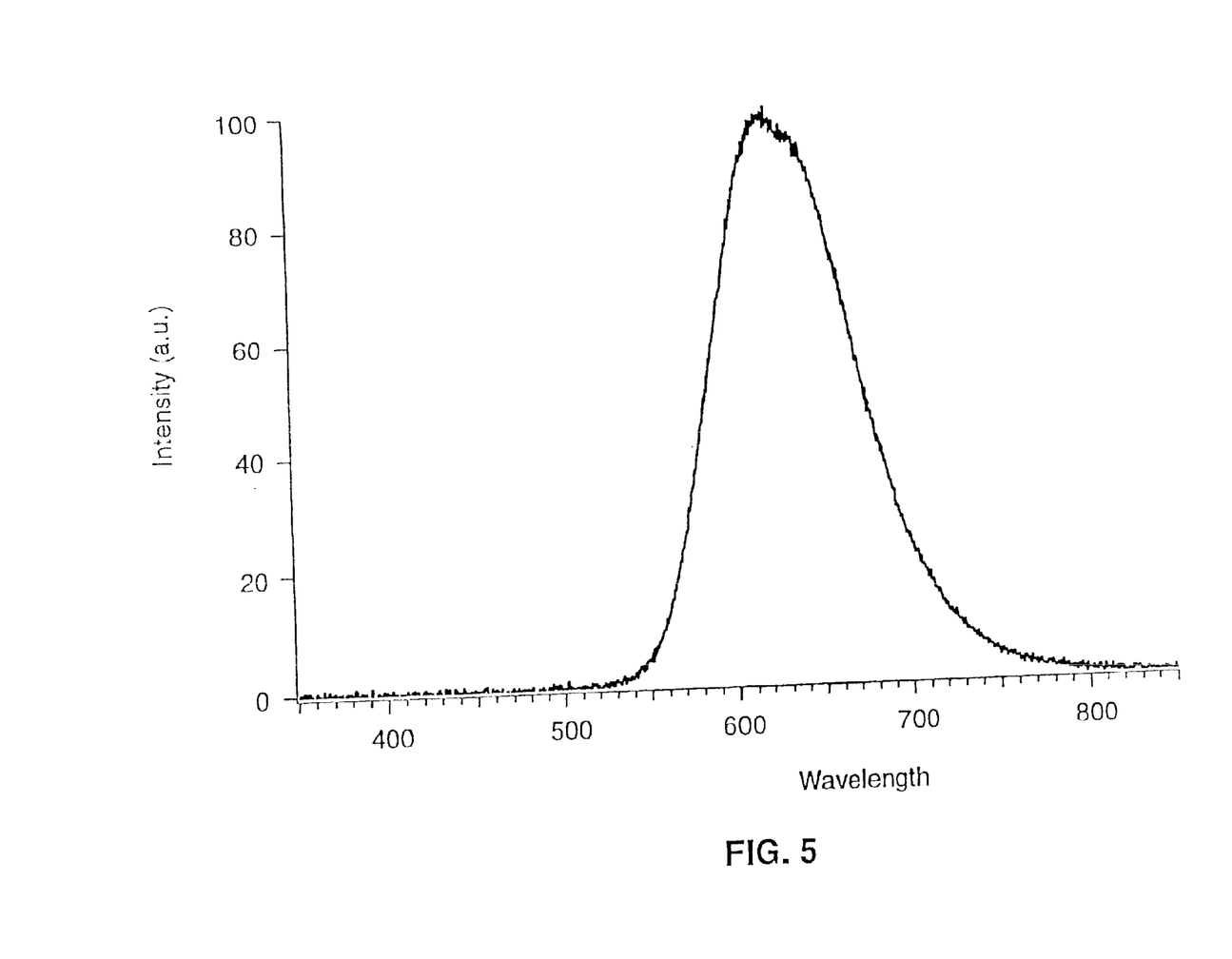
FIGS. 5–7: Emission spectrum of several embodiments of $Sr_2Si_5N_8$:Eu.

*depending on the conditions for preparation and concentration of the activator; typical values for Eu-concentration may vary between 1 and 10% compared to the alkaline-earth ion M These emission maxima are unusually far in the long wavelength side. A specific example is a phosphor of the type $Sr_{1.8}Eu_{0.2}Si_5N_8$. Its emission spectrum is shown in FIG. 5.

Another embodiment for realising M is the use of Zn. It can replace Ba, Sr or Ca fully or partially.

A further embodiment for replacing Si fully or partially is Ge. An concrete embodiment is $Sr_{1.8}Eu_{0.2}Ge_5N_8$.

Some further specific examples were investigated:

The preparation conditions and optical properties of the red emitting phosphor $Sr_2Si_5N_8$:$Eu^{2+}$ were investigated. Optimisation showed a quantum efficiency of about 70%. The emission is tuneable between 610 and 650 nm, depending on the $Eu^{2+}$ concentration in the sample and the heating conditions. The absorption at 400 nm and 460 nm is high (reflection of only 15–40%) and the temperature quenching of the luminescence at 80° C. is low (only 4%). The particle size of the phosphor is without milling below 5 μm. These properties make this phosphor very interesting especially for application in both the UV and blue LED.

For the nitride synthesis, the starting materials are $Si_3N_4$ (99,9% (mainly α-phase), Alfa Aesar), Sr metal (dendritic pieces 99,9%, Alfa Aesar) and $Eu_2O_3$ (4N). The Sr metal has to be nitrided and in case one uses instead of $Eu_2O_3$ Eu metal, this has also to be nitrided.

The Sr metal is milled by hand in an agath mortar in an argon glovebox and nitrided at 800° C. under $N_2$. This results in a nitration over 80%.

After remilling, the nitrided metal, together with $Si_3N_4$ and $Eu_2O_3$, is milled and mixed by hand again in the glovebox. The heating of this mixture has typically the following parameters:

18° C./min to 800° C.

5 h at 800° C.

18° C./min to $T_{end}$ (1300–1575° C.) 5 h at $T_{end}$ (1300–1575° C.)

$H_2$(3.75%)/$N_2$ 400 l/h $Ca_2Si_5N_8$:$Eu^{2+}$ samples were made with $Ca_3N_2$ as starting material.

An overview of all the samples is given in table 1. Typically, the samples were first heated at 800° C., and then they were heated a second time in the same cycle at elevated (1300–1600° C.) temperatures. The samples were then milled (mill under air), sieved and measured.

TABLE 1 parameters of heating cycles of $(Ca,Sr)_2Si_5N_8:Eu^{2+}$ samples

| Code | Ca/sr | $Eu^{2+}$ (%) | Time 1 (h) | Temp. 1 (° C.) | Time 2 (h) | Temp. 2 (° C.) |
|---|---|---|---|---|---|---|
| EC/HU 31/00 | Ca | 10 | 5 | 800 | 5 | 1400 |
| EC/HU 42/00 | Ca | 1 | 5 | 800 | 5 | 1565 |
| EC/HU 41/00 | Ca0.4Sr1.4 | 10 | 5 | 800 | 5 | 1565 |
| EC/HU 62/00 | Sr | 1 | 5 | 800 | 5 | 1400 |
| EC/HU 63/00 | Sr | 2 | 5 | 800 | 5 | 1400 |
| EC/HU 64/00 | Sr | 3 | 5 | 800 | 5 | 1400 |
| EC/HU 65/00 | Sr | 5 | 5 | 800 | 5 | 1400 |
| EC/HU 66/00 | Sr | 8 | 5 | 800 | 5 | 1400 |
| EC/HU 67/00 | Sr | 10 | 5 | 800 | 5 | 1400 |

The samples that are obtained after this heating show a color of deep orange for 10% $Eu^{2+}$ containing $Sr_2Si_5N_8$ samples. With less $Eu^{2+}$ the colour is fainter. The Ca samples have a yellow-orange colour.

There is also another interesting feature: the powder particles are very small with an average particle size $d_{50}$ between about 0,5 and 5 μm, a typically value is $d_{50}=1.3$ μm. The small particle sizes are advantageous for the processing of LEDs with luminescent material. For example they allow a homogeneous distribution in the resin.

TABLE 2

Optical data of $(Ca,Sr)_2Si_5N_8:Eu^{2+}$ samples

| Code | Ca/Sr | $Eu^{2+}$ (%) | Em. Max (nm) | Refl. 400 (%) | Refl. 460 (%) | QE (%) | x | y |
|---|---|---|---|---|---|---|---|---|
| EC/HU 31/00 | Ca | 10 | 619 | 12 | 19 | 26 | 0.600 | 0.396 |
| EC/HU 42/00 | Ca | 1 | 603 | 47 | 58 | 37 | 0.555 | 0.435 |
| EC/HU 41/00 | Ca0.4 Sr1.4 | 10 | 660 | 17 | 22 | 59 | 0.636 | 0,.354 |
| EC/HU 62/00 | Sr | 1 | 609 | 53 | 58 | 70 | 0.602 | 0.393 |
| EC/HU 63/00 | Sr | 2 | 618 | 43 | 48 | 73 | 0.615 | 0.381 |
| EC/HU 64/00 | Sr | 3 | 621 | 36 | 41 | 72 | 0.622 | 0.374 |
| EC/HU 65/00 | Sr | 5 | 624 | 26 | 32 | 67 | 0.632 | 0.365 |
| EC/HU 66/00 | Sr | 8 | 636 | 21 | 26 | 67 | 0.641 | 0.356 |
| EC/HU 67/00 | Sr | 10 | 644 | 17 | 22 | 64 | 0.642 | 0.354 |

Concerning table 2 all samples were typically first heated in a first cycle (for example 800° C. for 5 h), as already outlined above.

Included in table 2 are the position of the emission maximum, the mean wavelength, the reflection at 400 and 460 nm, the quantum efficiency and finally the x and y colour coordinates.

From table 2 it can be derived that the pure Ca samples are not as favourable as the Sr samples. It is surprising that the Sr-Ca compound has an emission wavelength that is larger than that of the pure Sr compound.

Figure 6:
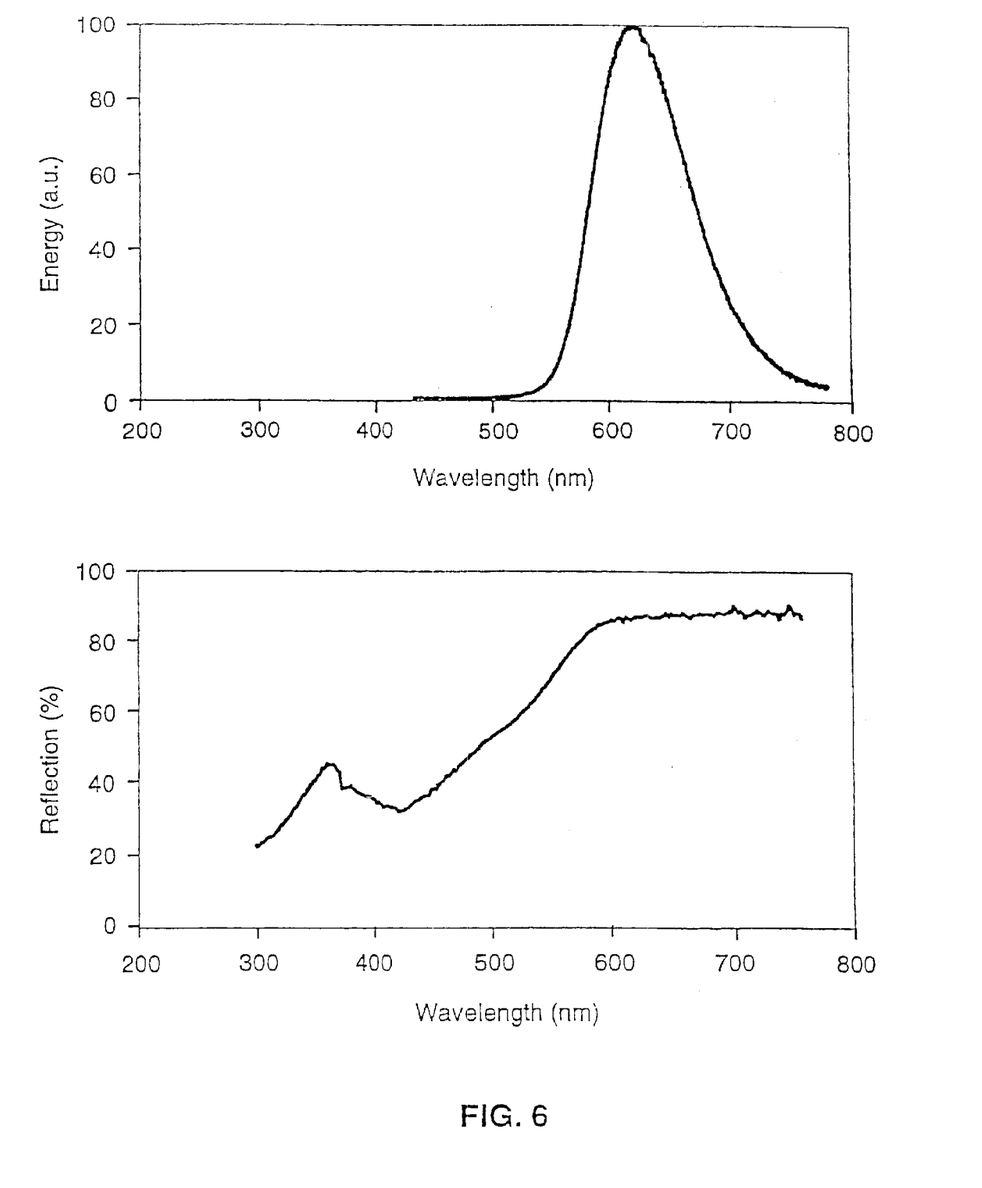
Figure 7:
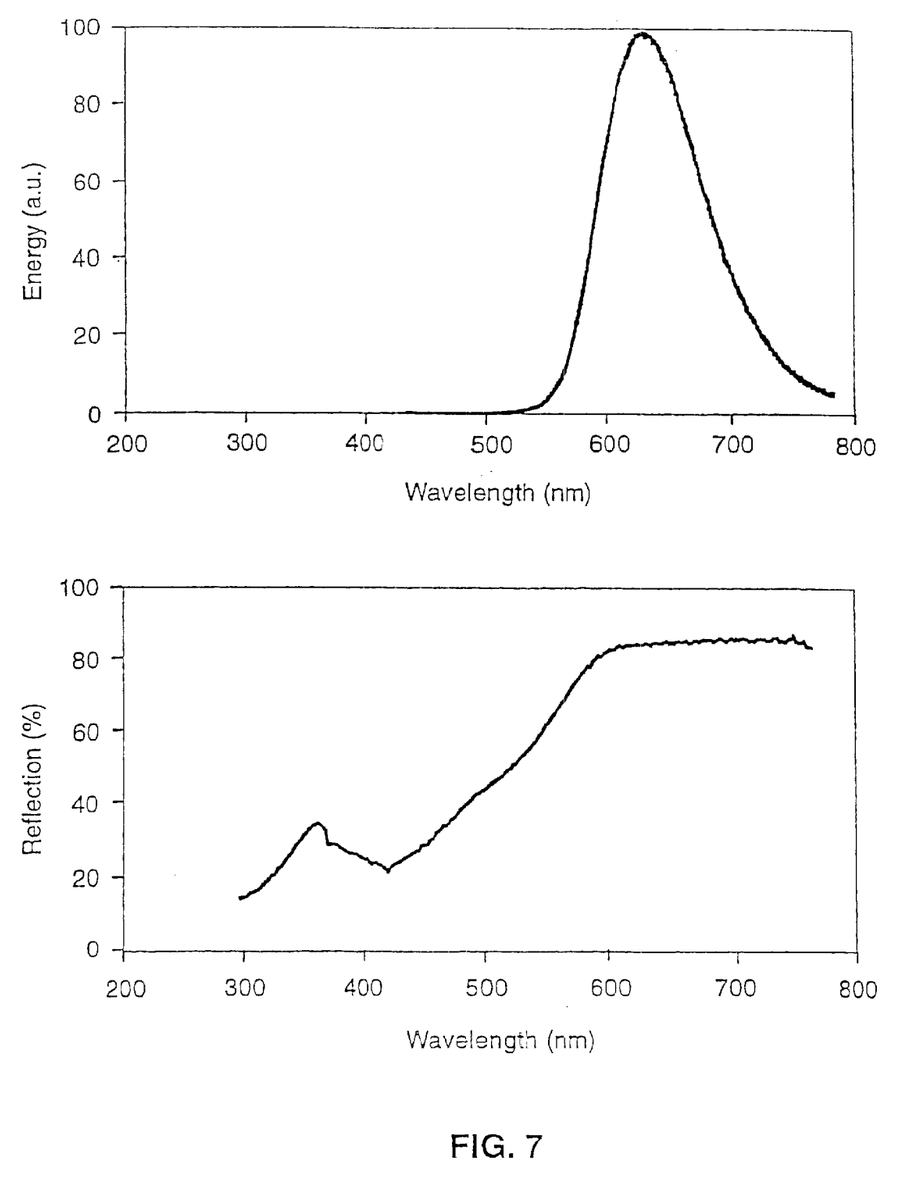
Figure 8:
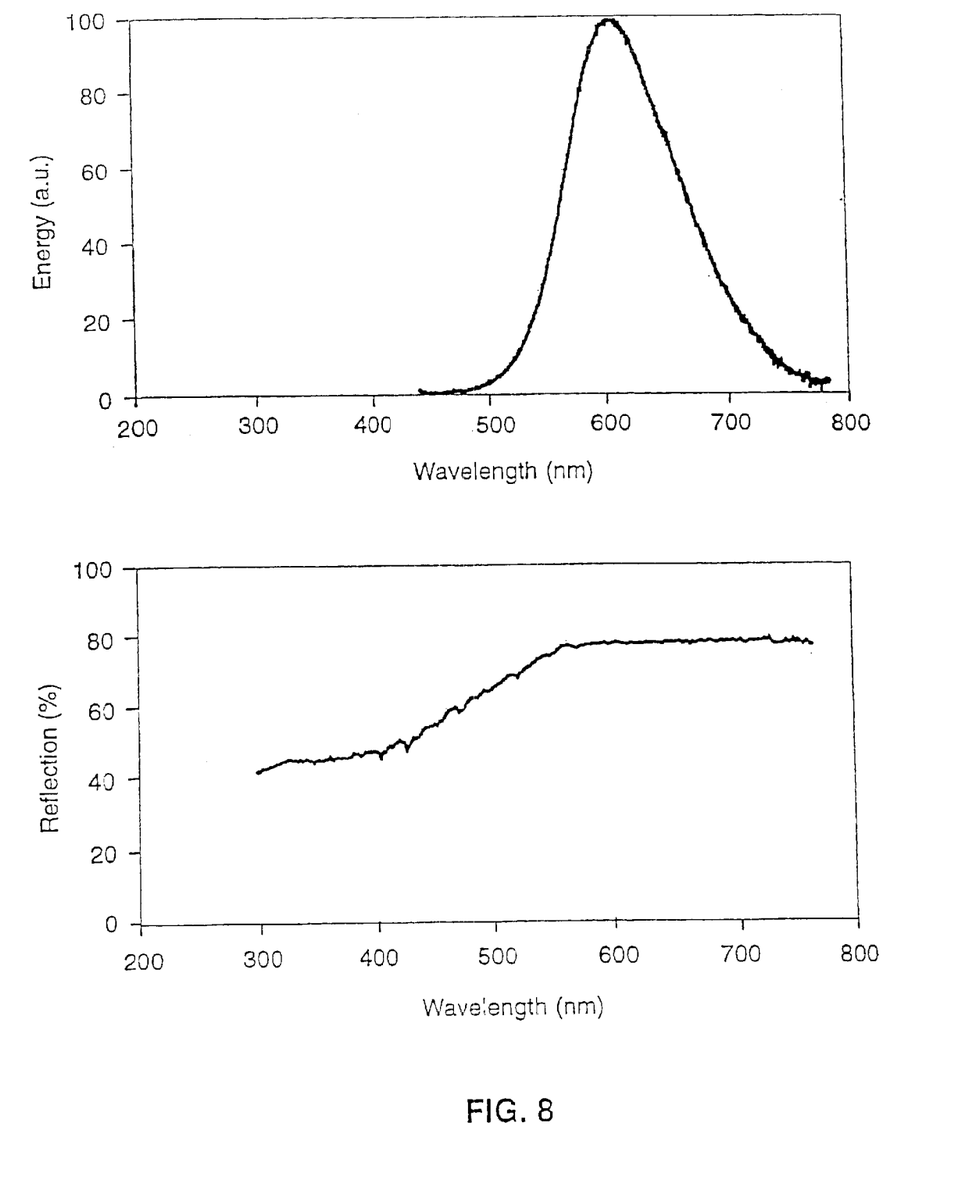
FIG. 8: Emission spectrum of $Ca_2Si_5N_8$:Eu.

Specific examples are shown in FIGS. 6 to 8. FIG. 6 shows the energy distribution (in arbitrary units) and reflection (in percent) of sample HU 64/00 ($Sr_2Si_5N_8:Eu^{2+}$) having a proportion of 3% Eu and a quantum efficiency of 72%. FIG. 7 shows the energy distribution (in arbitrary units) and reflection (in percent) of sample HU 65/00 ($Sr_2Si_5N_8:Eu^{2+}$) having a proportion of 5% Eu and a quantum efficiency of 67%. FIG. 8 shows the energy distribution (in arbitrary units) and reflection (in percent) of sample HU 42/00 ($Ca_2Si_5N_8:Eu^{2+}$) having a proportion of 1% Eu and a quantum efficiency of 37%.

What is claimed is:

1. Pigment with day-light fluorescence, with a host lattice of the nitrodosilicate type $M_xSi_yN_z$:Eu having $SiN_4$ tetrahedra wherein M is at least one of an alkaline earth metal selected from the group consisting of Ca, Sr, Ba, and Zn and said $SiN_4$ tetrahedra are cross-linked to a three-dimensional network in which alkaline earth metal M ions are incorporated and wherein $z=\frac{2}{3}x+\frac{4}{3}y$.

2. Pigment according to claim 1, wherein x=2, and y=5.

3. Pigment according to claim 1, wherein x=1, and y=7.

4. Pigment according to claim 1, wherein M is strontium.

5. Pigment according to claim 1, wherein M is a mixture of at least two metals of said group.

6. Pigment according to claim 1, wherein said pigment is absorbing within the blue to green spectral region.

7. Pigment according to claim 6, wherein said pigment is fluorescent within the yellow to red spectral region.

8. Pigment according to claim 1, wherein M is at least one of an alkaline earth metal selected from the group consisting of Sr, Ba and Zn alone or in combination with Ca and wherein $z=\frac{2}{3}x+\frac{4}{3}y$.

9. Pigment with day-light fluorescence, within a host lattice of the nitrodosilicate type MxSiyNz:Eu, wherein M is at least one of an alkaline earth metal selected from the group consisting of Ca, Sr, Ba, Zn and wherein $z=\frac{2}{2}x+\frac{4}{3}y$, and wherein x=2, and y=5.

10. Pigment with day-light fluorescence, within a host lattice of the nitrodosilicate type $M_xSi_yN_z$:Eu, wherein M is at least one of an alkaline earth metal selected from the group consisting of Ca, Sr, Ba, Zn and wherein $z=\frac{2}{3}x+\frac{4}{3}y$, and wherein x=1, and y=7.

11. Pigment with day-light fluorescence, with a host lattice of the nitrodosilicate type $M_xSi_{y'}Ge_{y''}N_z$:Eu (where y'+y"=y) having $Si_4$ tetrahedra wherein M is at least one of an alkaline earth metal selected from the group consisting of Ca, Sr, Ba, and Zn and said $SiN_4$ tetrahedra are cross-linked to a three-dimensional network in which alkaline earth metal M ions are incorporated and wherein $z=\frac{2}{3}x+\frac{4}{3}y$.

12. A coloring pigment comprising the pigment according to claim 1.

13. A phosphor excited by light sources, said phosphor emitting within the yellow-to-red spectral region and comprising the pigment according to claim 1.

* * * * *